United States Patent [19]

Saito et al.

[11] 4,091,428
[45] May 23, 1978

[54] ROTARY HEAD ASSEMBLY

[75] Inventors: Etsuro Saito, Kanagawa; Katsumasa Takahashi, Tokyo, both of Japan

[73] Assignee: Sony Corporation, Tokyo, Japan

[21] Appl. No.: 691,845

[22] Filed: Jun. 1, 1976

[30] Foreign Application Priority Data

May 30, 1975 Japan .............................. 50-72947[U]

[51] Int. Cl.$^2$ .............................................. G11B 5/54
[52] U.S. Cl. .................................................... 360/104
[58] Field of Search ............... 360/104, 103, 105, 128, 360/107

[56] References Cited

U.S. PATENT DOCUMENTS

| | | | |
|---|---|---|---|
| 2,913,536 | 11/1959 | Fuller et al. | 360/109 |
| 3,713,121 | 1/1973 | Fasano | 360/103 |
| 3,939,495 | 2/1976 | Nagai et al. | 360/105 |
| 3,994,018 | 11/1976 | Kihara et al. | 360/105 |

Primary Examiner—John H. Wolff

Attorney, Agent, or Firm—Lewis H. Eslinger; Alvin Sinderbrand

[57] ABSTRACT

A rotary head assembly, for example, for recording and/or reproducing video signals on a recording tape which is wrapped about at least a portion of the periphery of a tape guide drum, includes a support body moved in a circular path concentric with the guide drum, for example, by being secured to a rotated part of the latter, and having a radially outward directed portion, a plurality of parallel, resilient cantilevered support arms which are secured at one end to the radial body portion at spaced apart locations along the latter so as to extend from such body portion substantially at right angles to the latter, and a head member secured to the other ends of the resilient cantilevered support arms so that centrifugal movement of the head member through a gap of the guide drum and into engagement with the tape wrapped about the drum is resiliently resisted by flexing of the cantilevered support arms.

11 Claims, 15 Drawing Figures

ROTARY HEAD ASSEMBLY

BACKGROUND OF THE INVENTION

1. Field of the Invention

This invention relates generally to rotary head assemblies and, more particularly, is directed to improved rotary head assemblies for recording and/or reproducing video or other information signals on magnetic recording tape which is wrapped about at least a portion of the periphery of a tape guide drum with which each rotary head assembly is associated.

2. Description of the Prior Art

It has been proposed, for example, in U.S. patent application Ser. No. 566,539, filed Apr. 9, 1975, and having a common assignee herewith, to provide a rotary head assembly associated with a tape guide drum in a video signal recording and/or reproducing apparatus, as aforesaid, in which the head member or transducer is movable generally in the radial direction in respect to the tape guide drum, and the centrifugal movement of the head member or transducer is yieldably resisted by resilient support elements with a view to ensuring adequate contact of the head member or transducer with the surface of the tape wrapped about the guide drum in response to the movement of the rotary head assembly in a circular path concentric with the guide drum. In the existing rotary head assemblies as specifically disclosed in the above identified application, a generally U-shaped frame having a pair of spaced apart arms is mounted for movement in a circular path concentric with the guide drum with the free end portions of the frame arms extending generally radially outward in respect to the center of such path, and the head member which generally includes a mounting plate with a head chip extending from an end thereof is disposed between the spaced apart frame arms with substantial clearance therebetween, while the resilient support elements are in the form of elongated spring members extending substantially parallel to each other between the frame arms and being secured intermediate such arms to the mounting plate of the head member. The elongated spring members are constituted either by thin spring wires or spring strips which are secured under tension to the spaced apart frame arms. It will be apparent that the yieldable resistance to centrifugal movement of the head member is determined by the tension in the elongated spring members when secured to the spaced apart frame arms. However, in practice, considerable difficulty is encountered in providing a standard tension in the elongated spring members when secured to the frame arms, and also in effecting the attachment of the elongated spring members to the frame arms and to the mounting plate of the head member.

OBJECTS AND SUMMARY OF THE INVENTION

Accordingly, it is an object of this invention to provide a rotary head assembly of the described type, but which is free of the foregoing difficulties encountered in the manufacture of the existing rotary head assemblies.

More specifically, it is an object of this invention to provide an easily manufactured and assembled rotary head assembly comprised of a support body or frame which can be mounted for movement in a circular path concentric with a tape guide drum, and a head member which is movable in the centrifugal direction relative to the support body and which is attached to the latter by resilient means which yieldably resist such centrifugal movement of the head member.

Another object is to provide a rotary head assembly, as aforesaid, which is constructed and arranged to facilitate the accurate positioning of the head member within the circumferential gap of an associated tape guide drum.

Still another object is to provide a rotary head assembly, as aforesaid, which is adapted for association with a tape guide drum of relatively small diameter.

In accordance with an aspect of this invention, a rotary head assembly comprises a support body adapted to be mounted, for example, on a tape guide drum, for movement in a circular path and having a portion which extends substantially in the direction of a radius from the center of such path, a head member for recording and/or reproducing information signals on a tape or other record medium disposed along the circular path, and a plurality of parallel, resilient cantilevered support arms extending substantially at right angles to such radius and being spaced apart in the direction of the radius, with the resilient support arms being secured, at one end, to the radially directed portion of the support body and, at the other end, to the head member so that centrifugal movement of the head member relative to the support body in response to movement of the latter in the circular path is resiliently resisted by flexing of the cantilevered support arms. In the foregoing arrangement according to this invention, the resilient resistance to centrifugal movement of the head member is determined by the material and dimensions of the cantilevered support arms, rather than by any tension applied to such support arms while being secured to the head member and the support body. Thus, the resilient resistance to centrifugal movement of the head member can be readily standardized and the attachment of the cantilevered support arms to the head member and support body is facilitated when mass producing rotary head assemblies according to the invention.

The above, and other objects, features and advantages of the invention, will be apparent in the following detailed description of illustrative embodiments thereof which is to be read in connection with the accompanying drawings.

DESCRIPTION OF THE PREFERRED EMBODIMENTS

Figure 1:
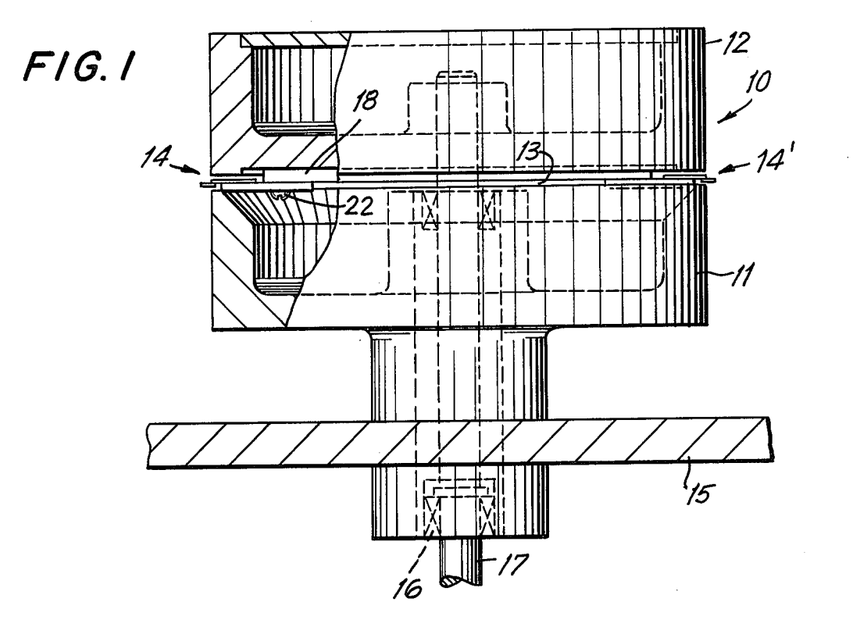
FIG. 1 is a side elevational view, partly broken away and in section, of a tape guide drum provided with rotary head assemblies according to this invention for recording and/or reproducing video or other information signals on a magnetic recording tape when the latter is wrapped about at least a portion of the periphery of the tape guide drum.

Referring to the drawings in detail, and initially to FIG. 1 thereof, it will be seen that, in a video recording and/or reproducing apparatus of a type to which the present invention may be applied, a tape guide drum 10 is provided which includes a lower portion 11 and an upper portion 12 spaced axially from lower portion 11 to define a circumferential slot or gap 13 therebetween. A magnetic tape (not shown) is helically wrapped about at least a portion of the periphery of drum 10 so that the plane of gap 13 will extend obliquely across the tape. A pair of substantially diametrically opposed rotary head assemblies 14 and 14' are associated with tape guide drum 10 so as to extend through slot 13 and thereby scan successive parallel record tracks extending obliquely across the tape wrapped about the periphery of drum 10 and being suitably longitudinally advanced as the head assemblies 14 and 14' are moved in a circular path which is concentric with drum 10. In the tape guide drum 10, as shown, the lower drum portion 11 may be fixedly mounted on a chassis 15 and contain a bearing assembly 16 in which a vertical shaft 17 is suitably journalled. The shaft 17 has its upper end portion projecting above lower drum portion 11 and suitably secured to upper drum portion 12 so that the latter will rotate with shaft 17 when such shaft is driven by a suitable drive source, such as, an electric motor (not shown). The rotary head assemblies 14 and 14' may be mounted directly on the undersurface of rotated drum portion 12, as hereinafter described in detail, or at the opposite ends of a support bar 18 which extends diametrically across the undersurface of drum portion 12 and is suitably secured to the latter. In either case, it will be apparent that the rotary head assemblies 14 and 14' are moved in a circular path concentric with drum 10 in response to rotation of upper drum portion 12.

Figures 2, 3:
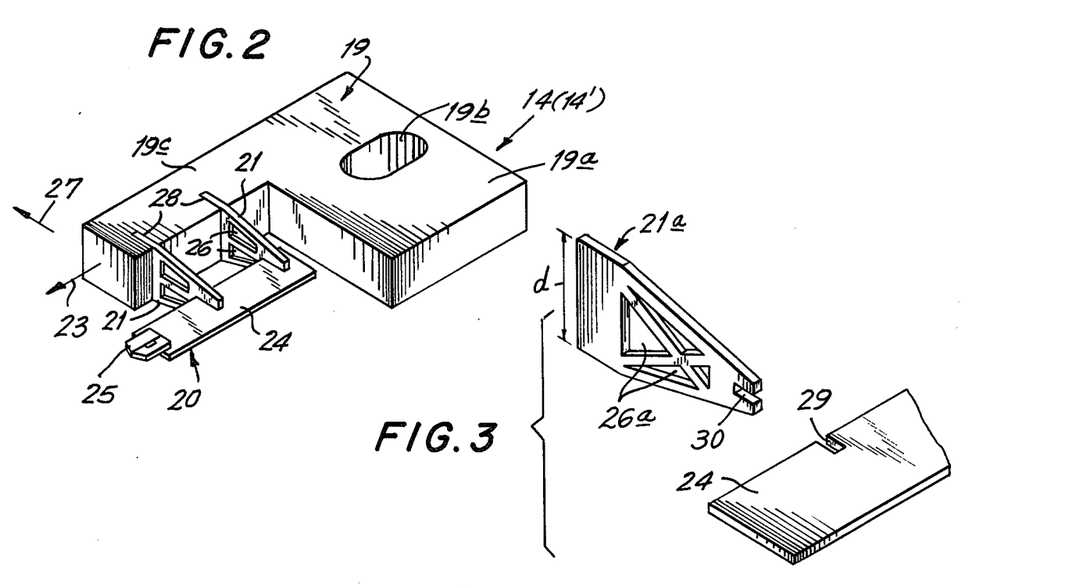
FIG. 2 is a perspective view showing a rotary head assembly according to one embodiment of this invention.
FIG. 3 is an enlarged, exploded perspective view showing two of the elements included in a modification of the rotary head assembly appearing on FIG. 2.

Referring now to FIG. 2, it will be seen that each of the rotary drive assemblies 14 and 14' according to this invention generally comprises a support body 19, a head member 20, and a pair of resilient support arms 21 by which head member 20 is connected with support body 19. Support body 19 is shown to be constituted by a generally L-shaped plate of substantial thickness having a base portion 19a provided with an opening 19b through which a screw 22 (FIG. 1) can be extended for securing the head assembly to the respective end of the bar 18 or directly to the undersurface of drum portion 12. The support body 19 further includes an arm portion 19c which extends from base portion 19a at one side of the latter substantially in the direction of a radius from the axis of rotation of drum 10, which direction is indicated by the arrow 23 on FIG. 2. The head member 20 is shown to include an elongated, relatively thin mounting plate 24 which extends substantially parallel to arm portion 19c of the support body, and a head chip 25 which is suitably secured to, and projects from the outer end portion of mounting plate 24.

In accordance with this invention, the resilient support arms 21 extend parallel to each other substantially at right angles to the radial direction 23 and are spaced apart in such radial direction. Further, as shown, the resilient support arms 21 are secured, at one end, to the arm portion 19c of support body 19 so as to be cantilevered in respect to such arm portion 19c, while the other ends of resilient support arms 21 are secured to mounting plate 24 so that centrifugal movement of head member 20 relative to support body 19 in response to rotation of the latter with drum portion 12 is resiliently resisted by flexing of support arms 21.

Each of the cantilevered support arms 21 is shown to be constituted by an elongated plate having a cross-section which is thin in the radial direction 23 so as to permit flexing in that direction, while having a substantial dimension in the direction parallel to the axis of rotation so as to strongly resist displacement of head member 20 relative to support body 19 in the direction of the axis of rotation. The cantilevered support arms 21 are preferably formed of carbon fibers impregnated with a suitable resin, or of metal spring materials, such as, phosphor bronze, beryllium bronze, or stainless steel, for example, the stainless steel designated as SUS 304 and containing approximately 10% Ni, 20% Cr and 2% Mn.

Each of the cantilevered support arms 21 is preferably formed with apertures 26 therein for decreasing the mass of the respective plate and thereby minimizing the influence of centrifugal force on the support arm itself. Further, as indicated in the case of the support arm 21a shown on FIG. 3, the apertures in the plate constituting each support arm are preferably arranged, as indicated at 26a so that the remaining material of the plate will form a truss-like structure for increasing the rigidity of the respective support arm 21a in the direction of the axis of rotation.

In the rotary head assembly 14 shown on FIG. 2, the cantilevered support arms 21 preferably extend from the arm portion 19c of support body 19 substantially in the direction opposed to the direction of rotation indicated by the arrow 27. In other words, the head member 20 is in a trailing position to the arm portion 19c of the support body considered in the direction of rotation so that any frictional force resulting from engagement of head chip 25 with the magnetic tape merely applies tension to the cantilevered support arms 21.

In order to facilitate the attachment of cantilevered support arms 21 to support body 19 and mounting plate 24 of head member 20, arm portion 19c of the support body has spaced apart slots 28 (FIG. 2) opening at the side thereof facing toward head member 20 for receiving the respective end portions of support arms 21, while the side edge portion of mounting plate 24 facing toward arm portion 19c has spaced apart slots 29, as particularly shown on FIG. 3, for receiving the end portions of support arms 21 to be secured to mounting plate 24. Further, the end portions of support arms 21 to be secured to mounting plate 24 are preferably provided with slots 30, as particularly shown on FIG. 3, for interlocking engagement with the respective slots 29 of the mounting plate. In assembling each of the rotary head assemblies 14 and 14', the end portions of support arms 21 engaged in slots 28 can be temporarily secured therein, for example, by a cyano-acrylic resin adhesive while interlocking engagement is achieved between the slots 29 and 30 of mounting plate 24 and support arms 21, whereupon the end portions of support arms 21 can be permanently affixed to arm portion 19c of the support body and to mounting plate 24 of the head member by means of an epoxy resin.

It will be apparent that, since support arms 21 do not need to be tensioned during the assembly of such support arms with support body 19 and head member 20, the assembling operations can be conveniently carried out. Furthermore, the support arms 21 can be easily standardized as to their material characteristics and dimensions so as to ensure a uniform resilient resistance to centrifugal movement of head member 20 relative to support body 19.

Figure 4:
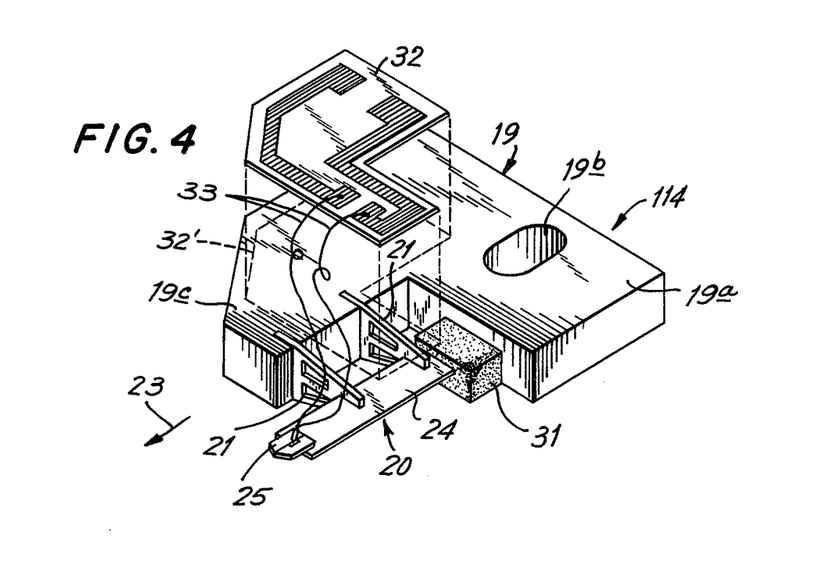
FIGS. 4, 5 and 6 are perspective views respectively showing other embodiments of rotary head assemblies according to this invention.

Referring now to FIG. 4, it will be seen that the rotary head assembly 114 according to the embodiment of the invention there illustrated is generally similar to the previously described rotary head assembly 14 and has its several corresponding parts identified by the same reference numerals. However, in the rotary head assembly 114, a damping member 31 of butyl, silicon or sponge rubber is adhesively secured between the radially inner end of mounting plate 24 of head member 20 and the confronting edge surface of base portion 19a of the support body 19. Such damping member 31 is effective to damp relatively low frequency vibrations of head member 20 in the radial direction. Further, as shown on FIG. 4, a printed circuit board 32 bearing a circuit for operation of head chip 25 may be adhesively mounted at the location indicated in broken lines at 32' directly on support body 19, whereby to permit relatively short lead wires 33 to be employed for connecting head chip 25 with circuit board 32.

Figure 5:
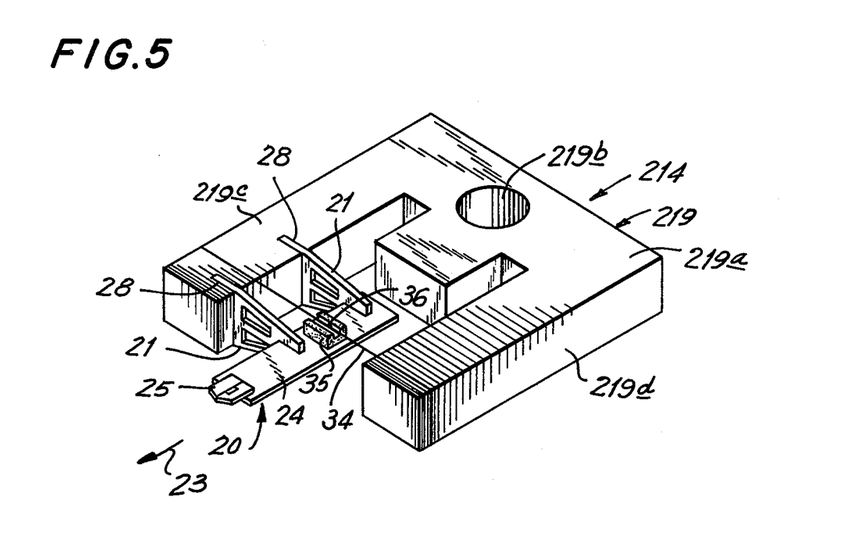

Referring now to FIG. 5, it will be seen that the rotary head assembly 214 according to another embodiment of this invention is also generally similar to the previously described rotary head assembly 14 and has its corresponding parts identified by the same reference numerals. However, in rotary head assembly 214, the support body 219 thereof is of generally U-shaped configuration to provide a base portion 219a with the opening 219b therein for mounting of the rotary head assembly, and a pair of radially outward directed arm portions 219c and 219d which are spaced apart to receive head member 20 therebetween. In the rotary head assembly 214, resilient, cantilevered support arms 21 again have their opposite end portions secured to arm portion 219c of the support body and to mounting plate 24 of the head member so that the latter is again resiliently supported from arm portion 219c. However, the rotary head assembly 214 includes means for limiting the centrifugal or radially outward movement of head member 20 relative to support body 219, for example, when exposed to an unexpectedly large centrifugal force. Such means for limiting the centrifugal or radially outward movement of head member 20 is shown to include a wire 34 which is stretched between the arm portions 219c and 219d of the support body and which is engageable, at its middle portion, by an engaging member 35 adhesively secured on mounting plate 24. The engaging member 35 may be formed with a laterally directed channel 36 which receives the middle portion of wire 34 so that, following a predetermined radially outward movement of head member 20 by centrifugal force acting thereon, a side surface of channel 36 engages wire 34 for resisting further centrifugal or radially outward movement of the head member. Further, the engaging member 35 may be formed of a damping material, for example, similar to that employed in the damping member 31 on FIG. 4, so that, upon engagement of member 35 with wire 34, relatively low frequency vibration of head member 20 in the radial direction will be damped.

In the rotary head assemblies 14, 114 and 214 described above, the end portions of the cantilevered support arms 21 or 21a which are received in the slots 28 of the respective support body 19 or 219 have had a dimension d (FIG. 3) approximately equal to the thickness of the support body, while the slot 30 at the other end of each support arm 21 or 21a for receiving the mounting plate 24 has been disposed to position the latter approximately midway between the opposite faces of the support body. In other words, the previously described support arms 21 and 21a are shaped substantially like isosceles triangles. However, as shown on FIG. 6, in a rotary head assembly 314 according to this invention which is otherwise generally similar to the previously described rotary head assembly 14 and has its corresponding parts identified by the same reference numerals, the resilient, cantilevered support arms 321 may be substantially in the form of right triangles so that, when the end portions of support arms 321 remote from arm portion 19c of support body 19 are secured in slots 29 of mounting plate 24, such mounting plate 24 of the head member will be coplanar with a locating face of support body 19, that is, with the face of support body 19 which is at the bottom of the latter as viewed on FIG. 6.

Figure 6:
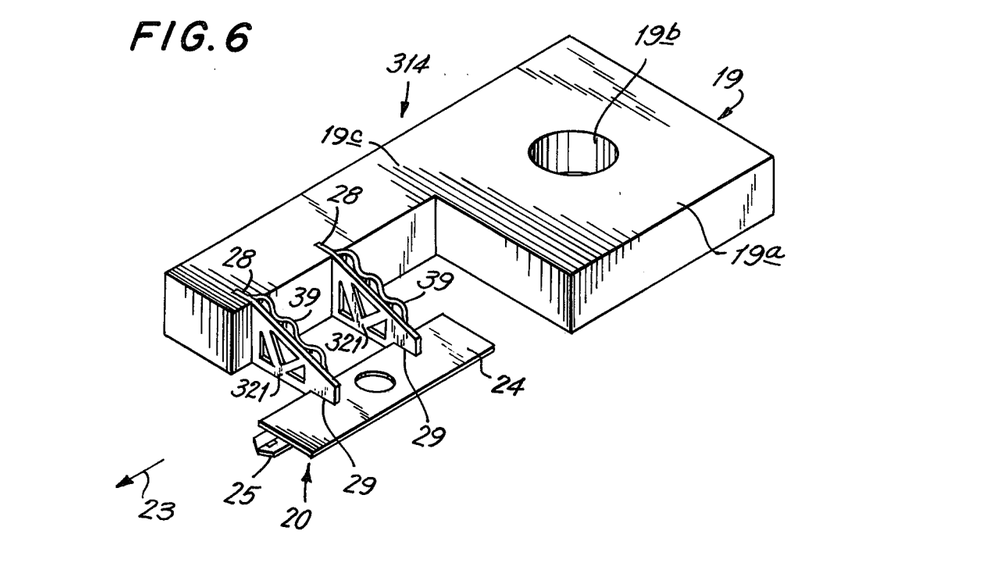

By reason of the foregoing arrangement of rotary head assembly 314, when the latter is secured directly to upper drum portion 12 by means of a screw 22 with the locating face 19' of support body 19 abutting against a corresponding locating surface 12' formed at the underside of drum portion 12, the head chip 25 will be precisely located, in the axial direction of the drum with respect to locating surface 12', and thus with respect to the gap 13 of the drum (FIG. 1) through which the head chip is to project for contact with the magnetic tape.

Figure 7:
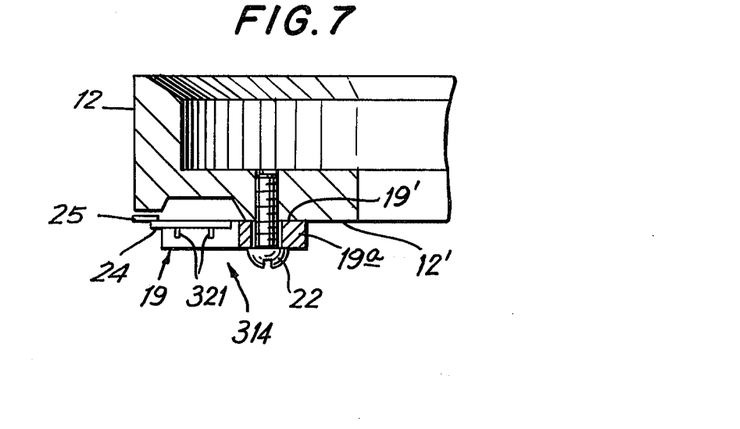
FIG. 7 is a fragmentary sectional view of a portion of a tape guide drum to which the rotary head assembly of FIG. 6 is attached.
Figure 8:
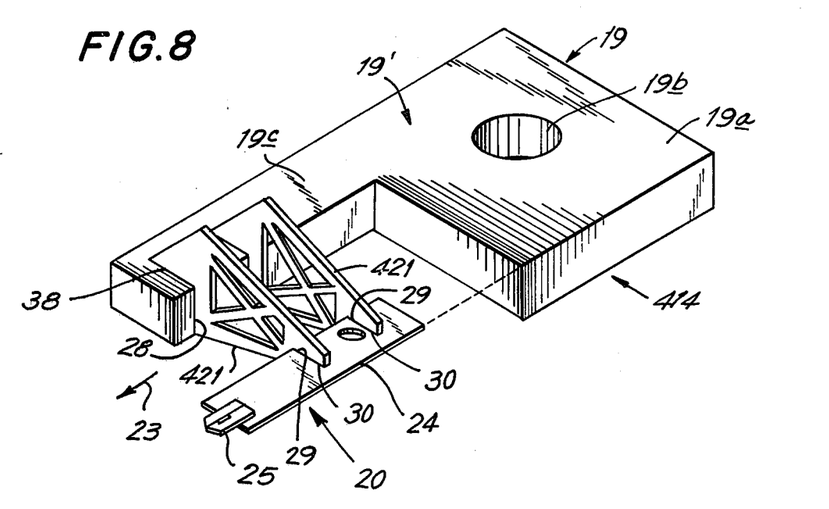
FIG. 8 is a perspective view of a rotary head assembly according to still another embodiment of the invention.
Figure 9:
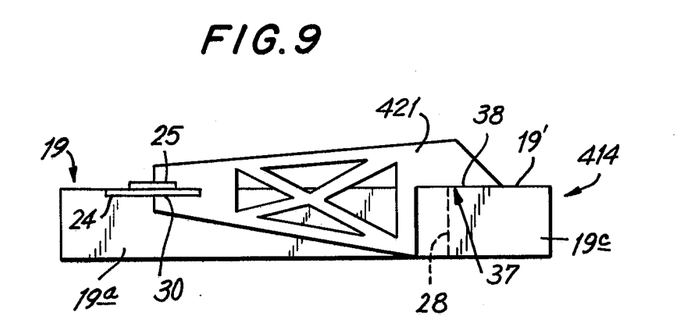
FIG. 9 is an enlarged, outer end elevational view of the rotary head assembly of FIG. 8.

Referring now to FIGS. 8 and 9, it will be seen that, in a rotary head assembly 414 according to another embodiment of this invention which is otherwise generally similar to the rotary head assembly 14 of FIG. 2 and has its corresponding parts identified by the same reference numerals, the cantilevered support arms 421 for resiliently supporting mounting plate 24 of head member 20 from support body 19 again have slots 30 centered at the end portions of support arms 421 to be secured to mounting plate 24 for interlocking engagement with the slots 29 of the mounting plate, while the opposite end portions of support arms 421 which are received in slots 28 of arm portion 19c of the support body have cutouts 37 (FIG. 9) each defining an edge 38 parallel to the longitudinal axis of the respective support arm 421 and being aligned with the respective slot 30. Thus, as shown particularly on FIG. 9, when mounting plate 24 of head member 20 is supported from support body 19 by means of support arms 421, the mounting plate 24 is disposed coplanar with the locating face 19' on support body 19 so as to provide the advantageous positioning of the head chip 25 as was described above in connection with the rotary head assembly 314 of FIGS. 6 and 7.

Although each of the resilient, cantilevered support arms 21,21a,321 and 421 has been described as consisting of an elongated thin plate of a suitably resilient material, each of such resilient support members may be reinforced by an auxiliary resilient member, for example, as shown at 39 on FIG. 6, in the form of an undulating spring wire which extends along an edge of the respective support plate 321 and is suitably secured thereto at spaced apart locations.

Figure 10:
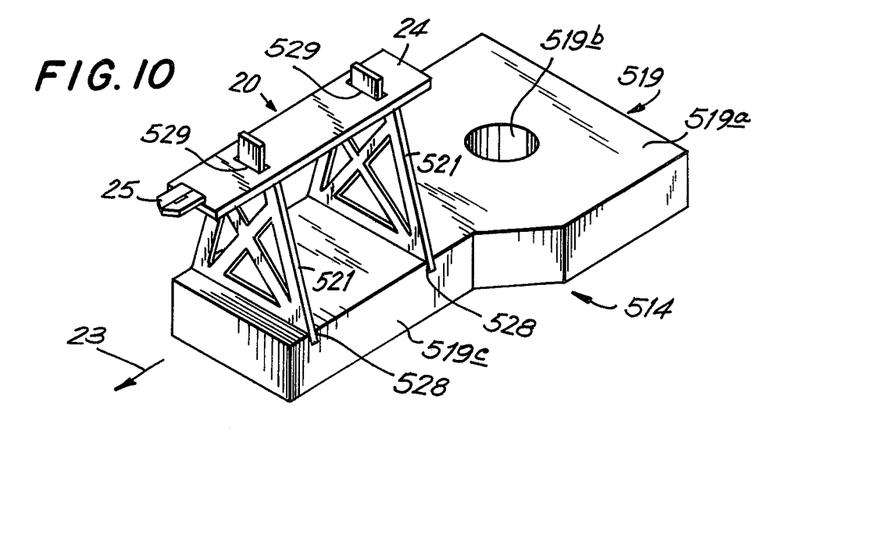
FIG. 10 is a perspective view of a rotary head assembly according to still another embodiment of the invention.

In all of the previously described embodiments of the invention, the head member 20 has been disposed alongside or in trailing relation to the arm portion 19c or 219c of the support body, and the cantilevered support arms have extended from such arm portion of the support body substantially in the direction opposed to the direction of rotation of the rotary head assembly. However, as shown on FIGS. 10-12, in a rotary head assembly 514 according to this invention, which is particularly suited for use in association with a tape guide drum of small diameter, the cantilevered support arms 521 may extend from the arm portion 519c of the support body 519 substantially parallel to the axis of rotation so as to dispose the head member 20 either substantially above, as shown, or substantially below the support body 519. More particularly, it will be seen that, in the rotary head assembly 514, support body 519 includes a base portion 519a with an opening 519b therein, and an arm portion 519c projecting radially outward from base portion 519a. Further, the upper surface of arm portion 519c is shown to have spaced apart slots 528 extending thereacross to receive the lower end portions of the resilient, cantilevered support arms 521 which, at their upper ends, engage in slots 529 provided in mounting plate 24 of the head member 20. The opposite end portions of the support arms 521 are again suitably secured, for example, by epoxy resin, to arm portion 519c of the support body and to mounting plate 24 of the head member so that the support arms will resiliently resist centrifugal movement of head member 20 when rotary head assembly 514 is moved in a circular path.

Figure 11:
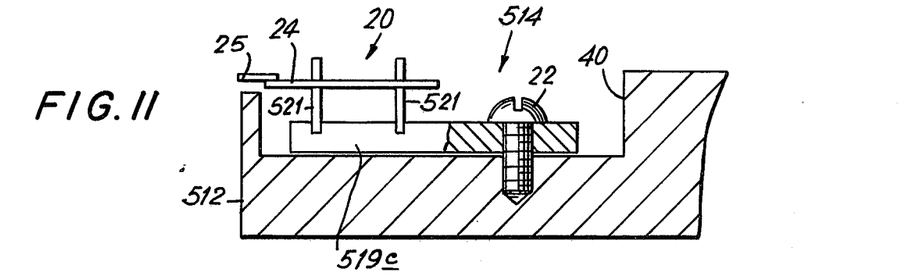
FIG. 11 is a sectional view illustrating the manner in which the rotary head assembly of FIG. 10 is mounted on a part of an associated tape guide drum.
Figure 12:
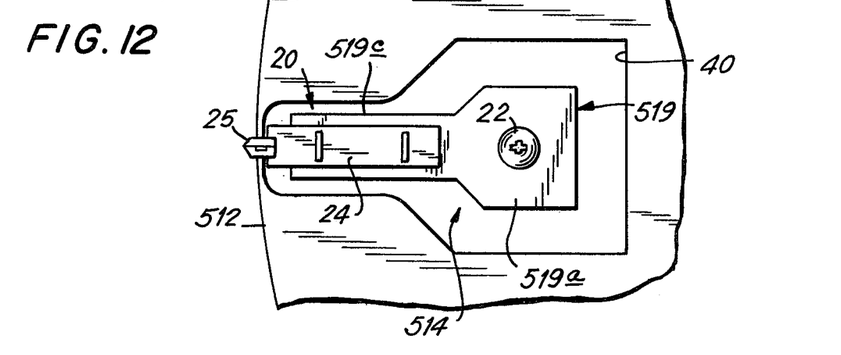
FIG. 12 is a top plan view of the rotary head assembly mounted on a part of the tape guide drum as in FIG. 11.

As shown particularly on FIGS. 11 and 12, the support body 519 of rotary head assembly 514 may be conveniently secured, as by the screw 22 passing through its opening 519b, in a recess 40 of a rotated drum portion 512 so that the mounting plate 24, as elevated by support arms 521, will extend radially outward at the top of recess 40 and project the head chip 25 into the circumferential gap between the periphery of rotated drum portion 512 and a complimentary drum portion (not shown). It will be apparent that, upon rotation of rotary head assembly 514 with drum portion 12, centrifugal movement of head member 20 will be yieldably resisted by the resilient, cantilevered support arms 521, as in the previously described embodiments of the invention. Furthermore, due to the relatively small overall lateral width of rotary head assembly 514, the latter can be conveniently employed in association with a tape guide drum of small diameter and hence of relatively sharp curvature at its periphery.

Figure 13A:
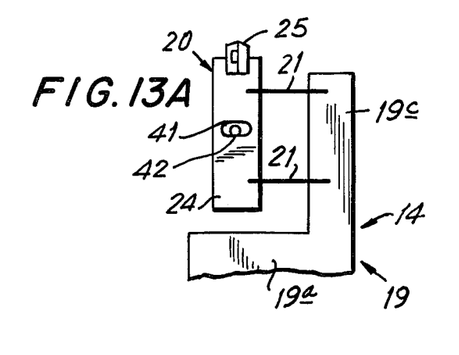
FIGS. 13A and 13B are fragmentary top plan views of a rotary head assembly according to this invention, and to which reference will be made in explaining how the head chip of such assembly can be lapped.
Figure 13B:
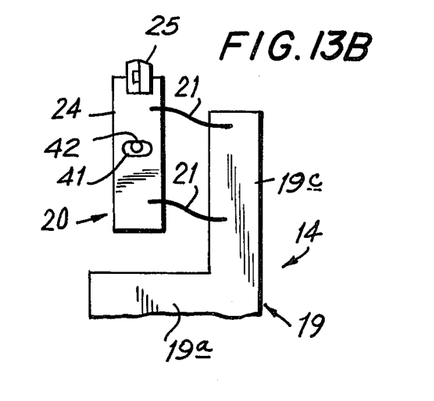
Figure 14:
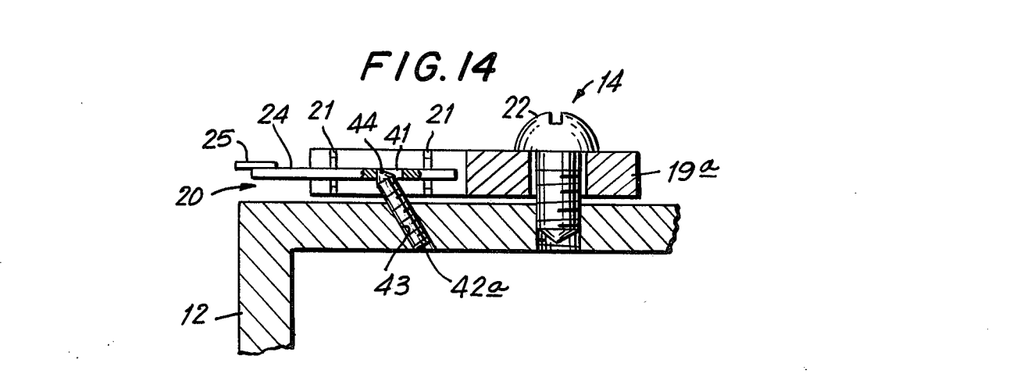
FIGS. 14 and 15 are sectional views respectively showing two different arrangements by which the head chip is accurately positioned during the lapping process.

Referring now to FIGS. 13A and 13B, it will be seen that a rotary head assembly according to this invention, for example, the assembly 14 described above with reference to FIG. 2, may be easily adapted to permit lapping of the surface of its head chip 25 which is to be engaged with the magnetic recording tape. More particularly, as shown, the mounting plate 24 of head member 20 may be provided with an opening 41 into which a positioning element 42 may be selectively extended so as to move head member 20 from its rest position (FIG. 13A) to the position shown on FIG. 13B at which head chip 25 is projected beyond its normal operating position. As shown on FIG. 14, the positioning element indicated schematically at 42 on FIGS. 13A and 13B may be constituted by a screw 42a threaded into an inclined, tapped bore 43 provided in the rotary drum portion 12 and having a tapered end 44. When screw 42a is retracted into tapped bore 43, tapered end 44 of the screw is withdrawn from opening 41 of mounting plate 24 so that the latter is then free to move radially against the yieldable resistance of cantilevered support arms 21. However, when screw 42a is turned in bore 43 so as to extend therefrom, as shown on FIG. 14, the tapered end 44 of the screw engages in opening 41 to displace mounting plate 24 radially outward and thereby position head chip 25 for the lapping process.

Figure 15:
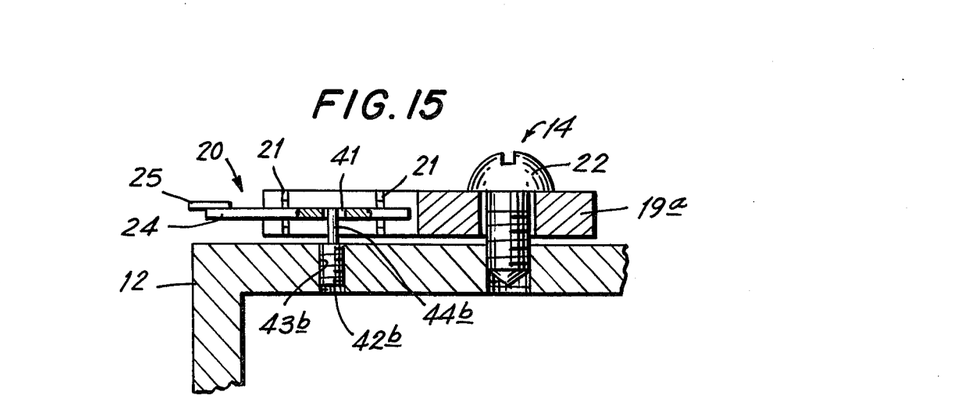

FIG. 15 shows a modification of the arrangement described above with respect to FIG. 14, and in which the screw 42b is threaded in a tapped bore 43b extending parallel to the axis of the drum, and a pin 44b which is eccentrically located with respect to the axis of screw 42b extends from the latter for loose engagement in opening 41 of the mounting plate 24. It will be apparent that screw 42b can be moved downwardly in bore 43b for completely withdrawing pin 44b from opening 41, as during normal operation of the associated rotary head assembly 14. However, when the head chip 25 is to be lapped, screw 42b can be moved to the position shown on FIG. 15 and further rotated to cause the eccentric pin 44b to act against an edge of opening 41 and thereby move head chip 25 to its projected position for the lapping operation.

Although illustrative embodiments of this invention have been described in detail herein with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. A rotary head assembly comprising: rotary drive means; a support body coupled to said rotary drive means for rotation with the latter and having a portion which extends substantially in the direction of a radius from the axis of said rotation; a head member for recording and/or reproducing information signals on a record medium; and a plurality of parallel, resilient, cantilevered platelike support arms extending substantially at right angles to said radius and being spaced apart in said direction of the radius, each of said arms having a cross-section which is relatively small in the direction of the radius and relatively large in the direction parallel to the axis so as to flex substantially only in the direction of the radius, one end of each of said resilient support arms being secured to said portion of the support body and the other end of each of said support arms being secured to said head member so that centrifugal movement of said head member relative to said support body in response to said rotation of the latter is resiliently resisted by flexing of said support arms while holding said head member substantially in alignment relative to said record medium, said cantilevered support arms extending from said portion of the support body substantially in the direction opposed to the direction of said rotation, and each of said platelike arms having apertures therein for decreasing the mass thereof and thereby minimizing the influence of centrifugal force thereon.

2. A rotary head assembly according to claim 1; further comprising a damping member interposed between said head member and said support body for damping low frequency vibrations of said head member in said direction of the radius.

3. A rotary head assembly according to claim 1; further comprising means for limiting the centrifugal movement of said head member in respect to said support body.

4. A rotary head assembly according to claim 3; in which said support body is generally U-shaped to provide a second portion extending substantially in said direction of the radius and being spaced from the first mentioned portion of the support body with said head member being disposed between said first and second portions of the support body; and in which said means for limiting the centrifugal movement of said head member includes a wire stretched between said first and second portions of the support body, and means on said head member engaging said wire.

5. A rotary head assembly according to claim 4; in which said means on the head member engaging said wire is of a damping material for damping low frequency vibrations of said head member in said direction of the radius.

6. A rotary head assembly according to claim 1, in which said head member includes a head chip and a mounting plate having said head chip secured to an end of said mounting plate; and in which the other end of each of said cantilevered support arms is secured to said mounting plate.

7. A rotary head assembly according to claim 6; in which said portion of the support body and said mounting plate each have slots therein for receiving the respective ends of said cantilevered support arms which are respectively secured thereto.

8. A rotary head assembly according to claim 7 in which said other end of each of said cantilevered support arms has a slot for interlocking engagement with the respective slots of said mounting plate.

9. A rotary head assembly according to claim 6 in which said rotary drive means includes a drum for guiding a record medium on its peripheral surface during the recording and/or reproducing of information signals on said record medium by said head chip, said drum comprises upper and lower drum parts which are axially spaced apart to define a circumferential gap therebetween through which said head chip can project outwardly for engagement with the record medium, and at least one of said drum parts is rotatable and has an axially facing locating surface; and in which said support body has a planar locating face and is secured to said one drum part with said locating face of the support body abutting said locating surface of said one drum part, and said support arms dispose said mounting plate of the head member with one surface thereof coplanar with said locating face of the support body, said head chip being secured to said one surface of said head member for precisely locating said head chip relative to said gap in the direction of said axis.

10. A rotary head assembly according to claim 9 in which said one end of each of said support arms has a cutout defining an edge parallel to its longitudinal dimension to engage said locating face of the support body when said one end of the respective support arm is secured to said support body, and said other end of each support arm has a longitudinal slot which is aligned with said edge of the cutout and which receives said mounting plate when said other end is secured to the latter so as to dispose said mounting plate coplanar with said locating face.

11. A rotary head assembly according to claim 9; in which said portion of the support body and said mounting plate have slots therein opening at their respective sides which face each other for receiving the ends of said cantilevered support arms which are respectively secured to said portion of the support body and said mounting plate; and in which said support arms have respective edges which are flush with said locating face of the support body and a surface of said mounting plate when the ends of said support arms are secured in said slots.

* * * * *